United States Patent [19]

Fuller

[11] 4,280,571

[45] Jul. 28, 1981

[54] ROCK BIT

[75] Inventor: Dennis D. Fuller, Duncanville, Tex.

[73] Assignee: Dresser Industries, Inc., Dallas, Tex.

[21] Appl. No.: 114,919

[22] Filed: Jan. 24, 1980

[51] Int. Cl.³ ............................................ E21B 10/22
[52] U.S. Cl. .................................... 175/337; 175/227;
308/8.2; 308/240
[58] Field of Search ...................... 175/337, 227, 228;
308/8.2, 240

[56] References Cited

U.S. PATENT DOCUMENTS

| 3,365,247 | 1/1968 | Ferrand | 308/8.2 |
| 3,547,819 | 12/1970 | Davis | 308/240 X |
| 3,952,815 | 4/1976 | Dysart | 175/337 |
| 4,193,463 | 3/1980 | Evans | 175/337 |
| 4,206,952 | 6/1980 | Olschewski | 308/8.2 |

FOREIGN PATENT DOCUMENTS 975124 11/1964 United Kingdom .................... 308/8.2

Primary Examiner—William F. Pate, III
Attorney, Agent, or Firm—Fred A. Winans

[57] ABSTRACT

An improved lubrication and seal system for a rock bit that includes a bit body arranged to be connected to a drilling string or the like and having an axle portion thereon. A cutting member is journaled on the axle portion and provides a cavity between the axle portion and cutting member in which there are disposed a bearings for rotatably supporting the loads on the cutting member on the axle portion. A pressurized fluid passageway extends through the bit body to the cavity for transmitting bearing conditioning fluid to the bearings. A permeable material having a lubricant in the pores in the material is disposed in the available space between bearings in the cavity in contact with the load carrying bearing and in the fluid passageway whereby the lubricant in the pores is gradually deposited on the bearing to provide a generally continuous in situ lubrication thereof. The permeable material is a gel that is formed as a lubricant mixed with polymers and heated to a predetermined temperature and which, under bit operating conditions is generally expelled from said bit, thereby opening the passage and cavity to pressurized bearing conditioning fluid.

10 Claims, 2 Drawing Figures

ROCK BIT

BACKGROUND OF THE INVENTION

This invention relates generally to improved rock bits. More particularly, but not by way of limitation, this invention relates to an improved rock bit lubrication system that has a cutter member journaled on an axle with the load carrying bearing therein substantially encapsulated in an expellable permeable material that, during its presence seals and lubricates the bearing in situ and upon expulsion permits normal bearing lubrication or conditioning.

Rock bits operate in extremely harsh environments while drilling a borehole in search of oil or gas, and when used in drilling the borehole for mining in which blasting charges are set. A borehole may contain a pressurized drilling mud which is used for circulating the cuttings out of the borehole as well as cooling and to some extent, providing lubricating fluid to the bit. Alternatively, pressurized air, although there is usually some water present may be circulated downwardly through passages in the bit to the load bearing areas to cool or lubricate or otherwise condition the bearings and also through jetting ports in the bit to remove the cuttings from the borehole. Also, the bits are subjected to thousands of pounds of force exerted thereon to force the cutting structure to disintegrate very hard formations as the drill bit is rotated in the borehole.

It is highly desirable, of course to make the drill bit last as long as possible and to cut as much borehole as possible, without having to remove the bit from the drilling string and place a new one thereon. In order to achieve this longer life, cutting structures have been improved, the materials forming the drill bit have been improved, and all types of improvements have been attempted and made to the load bearing structure itself. Among these, there has been proposed and used a sealed reservoir of lubricant which is connected to the bearing cavity through passageways in the axle and, due to the pressure of the environment, constantly urges the lubricant into the load bearing areas. In said such circumstances, the cavity containing the bearings must be sealed and any leakage of the seals can seriously affect the lubricating system. Also, it is difficult to provide sufficient lubrication to last for the desired period of time. As previously stated some of the bits used in drilling blast holes for mining have been provided with pressurized air passages in the axle that circulate air, which is pumped down the drill string and into the bit, into the load bearing structure and outwardly therefrom to cool the bearings and prevent cuttings from getting into the bearing cavity. The only lubrication provided is that which has been initially packed around the bearing elements.

The object of this invention then is to provide rock bit having an improved bearing lubrication system that will extend the operating life of the bit.

SUMMARY OF THE INVENTION

This invention provides a rock bit that includes a bit body arranged to be connected in a drill string, an axle portion on the body, and a cutting member journaled on the axle portion and defining a cavity therebetween and bearing conditioning fluid passage through the axle of the cavity. Load bearing means are disposed in the cavity. The improvement comprises a permeable material having a lubricant in the pores of the material disposed in the pressurized fluid passages and in the bearing cavity in contact with the load carrying bearing, whereby material generally seals the cavity from pressurized fluid and from cuttings and the lubricant in the pores is gradually deposited on the bearing to provide a continuous in situ lubrication of the rock bit. As the material is gradually extruded therefrom under use, the passages and cavity become open to the communication thereto of bearing conditioning fluid to extend the lubricated life of the bit.

BRIEF DESCRIPTION OF THE DRAWING

The foregoing and additional objects and advantages of the invention will become more apparent as the following detailed description is read in conjunction with the accompanying drawing, wherein like reference characters denote like parts in all views, and wherein.

DETAILED DESCRIPTION OF THE PREFERRED EMBODIMENT

Figure 1:
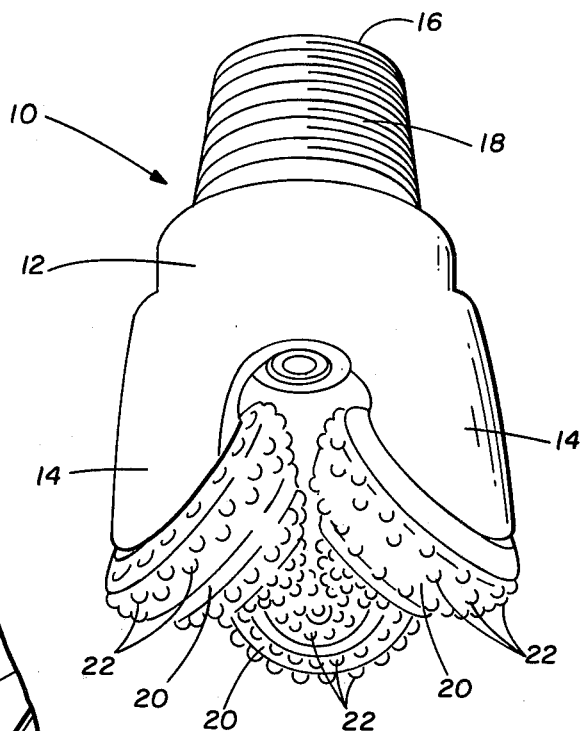
FIG. 1 is a pictorial view of a tricone rock bit that is constructed in accordance with the invention.

Referring to the drawing and FIG. 1 in particular, shown therein, and generally designated by the reference character 10, is a bit constructed in accordance with the invention. The particular bit illustrated is a tricone rock bit used for drilling blast holes and the bit includes a body 12 having three arms 14 depending therefrom (only two can be seen in FIG. 1), a pin portion 16 that is threaded at 18 for connecting the bit 10 into a drilling string (not shown).

A cutting member 20 is located on each of the arms 14 and is rotatable relative thereto as will be described. Each of the cutting members 20 is illustrated as including a plurality of hard inserts 22, which may be made of tungsten carbide, distributed about the cutting members 20 to accomplish the disintegration of a formation in a particular manner. The bit body also includes a jet 24 that is located between each of the arms 14 and is arranged to direct air or water downwardly relatively between the cutter members 20 to clean the cutter members 20 and to flush cuttings from the bore as it is drilled.

Figure 2:
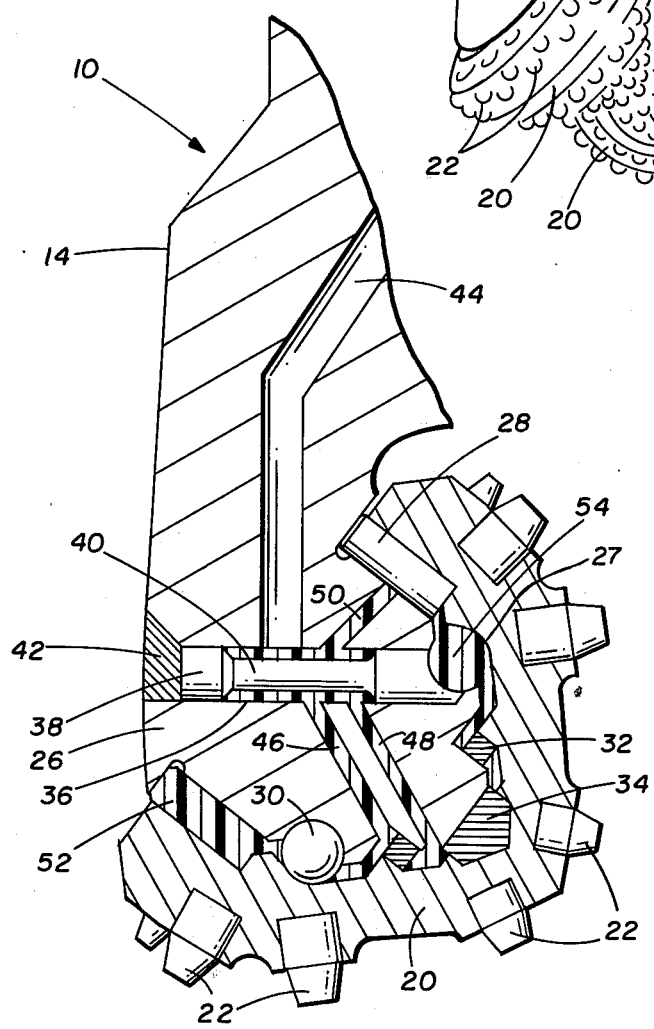
FIG. 2 is an enlarged partial cross-section taken through one arm of the bit in FIG. 1 illustrating the invention in more detail.

Referring to FIG. 2, it can be seen therein that each cutting member 20 has a hollow interior and is mounted on an axle portion 26 of each arm 14. Disposed between the exterior of the axle portion 26 and the interior of the cutting member 20 is a plurality of bearing cavities 27 that are arranged to receive roller bearings 28, ball bearings 30, a pilot bushing 32, and a thrust button 34. The pilot bushing 32 encircles part of the axle portion 26 that is known as the pilot pin.

The axle portion 26 has a hole 36 drilled therethrough into the cavity 27 in which the ball bearings 30 are disposed. The passageway 36 is sized to receive the ball bearings 30 and is provided to permit the ball bearings 30 to be inserted in the appropriate bearing cavity after the cutting member 20 has been placed on the axle portion 26. After the ball bearings 30 have been inserted, a plug 38 is placed in the hole 36 to prevent the ball bearings 30 from coming out of the bearing cavity.

As illustrated in FIG. 2, the plug 38 includes a reduced diameter center portion 40 for reasons that will be explained. After the plug 38 is in place, the outer end of the opening 36 is plugged with weld as illustrated at 42.

Each bit arm 14 has a pressurized fluid passageway 44 formed therein that extends from the interior of the body 12 to the hole 36 adjacent the reduced diameter portion 40 of the plug 38. In this embodiment the passageway 44, the hole 36, ports 46, 48 and 50, each of which extends from the openings 36 to a respective bearing area of the axle portion 26, completes the usual air cooling system of the bit 10 for delivering pressurized conditioning air to the bearings. However, it should be noted that the passageway 44 could also contain a sealed lubricant reservoir for alternatively delivering through the respective ports, lubricant for also conditioning the bearings.

In the improved bit lubricant system of the instant invention the opening 36 around the reduced diameter portion 40 of the plug 38, the ports 46 and 48 are filled with a permeable material that has a lubricant in the pores of the material. It will also be noted and as illustrated at 52, that the permeable material fills the spaces between the roller bearings 28 and between the cutter member 22 and the arm 14. Similarly, and as can be seen at 54, the bearing cavity 27 is also filled with the permeable material virtually encapsulating the ball bearings 30. Since the permeable material can be poured or injected into the bit 10, the material infiltrates virtually all of the openings or cavities that are formed between the cutter member 20 and the axle portion 26 and the load carrying bearing, and after setting to its gelatinous condition, seals the cavity 27 from external cuttings entering the cavity and also plugs the passage 44 against the passage of any conditioning fluid. It is also contemplated by the invention to encapsulate the bearings 28, 30 in the plastic material prior to assembly of the components with sufficient material to fill the bearing cavity 27 when assembled.

The permeable material utilized is clearly described in U.S. Pat. Nos. 3,541,011 issued Nov. 17, 1970 to William J. Davis et al. and 3,547,819 issued Dec. 15, 1970 also to William J. Davis et al. As described therein, the permeable material is a gel formed by mixing a lubricating oil with either high molecular weight polyethylene or low molecular weight polyethylene or a combination thereof in certain ratios, and elevating the temperature to specified range. Some of the gels are virtually liquid while some are very rigid. For use in the bit 10, it is preferred that the gel be composed of a mixture of the high molecular weight polymer, low molecular weight polymer and a satisfactory lubricant with a sufficient quantity of the low molecular weight polyethylene being utilized so that the resulting material will, under the temperature and pressure to which it is exposed during drilling operations, be expelled from the cavity after losing its lubricating capacity. Thus, due to the temperature and pressure, the material will eventually be extruded out of the passageways, ports and bearing cavities of the drill bit to permit the bearings in the cavity to then be lubricated and/or cooled by the flow of a pressurized fluid such as lubricant or air therethrough.

With the material thus composed, it is possible to provide a considerably extended operating life to the bit 10, since the permeable material with its lubricant will seal the bit against the intrusion of deleterious material, while at the same time, providing in situ lubrication until all of the lubrication in the permeable material has been expended. When this occurs, the bit is then in substantially the same condition that it would have been had the permeable material not been placed in the bit to start with. Thus, an additional operating period for the bit is provided.

It will, of course, be understood that although a blast hole bit of the air drilling type has been described as the preferred embodiment, the permeable material used in lubricating the bearings can be utilized in virtually any type of rock bit, and thus, this invention should not be limited to the specific embodiment described.

Having described but a single embodiment of the invention, it will of course be understood that many changes and modifications can be made thereto, without departing from the spirit of the invention.

The embodiments of the invention in which an exclusive property or privilege is claimed are defined as follows:

1. An improved bearing lubrication and seal system for a rock bit including a bit body arranged to be connected in a drill string, an axle portion on said body, a cutting member journaled on said axle portion, a bearing cavity between said axle portion and said cutting member, bearing means disposed in said bearing cavity for supporting the load of the cutting member on said axle portion and pressurized fluid passage means interiorly of said axle means and terminating at said bearing cavity for transmitting bearing conditioning fluid to said bearing means; wherein said improved system comprises:

a lubricant containing plastic material interposed in said cavity and between and in contact with said bearing means and at least partially filling said bearing cavity to continuously lubricate said bearings and blocking said fluid passage means from the transmission of said pressurized fluid through said cavity;

said material having the characteristic of being flexible under bit operating conditions whereby during use of said rock bit said material is gradually expelled from between said cavity and from said bearing means downstream of said bearing means to continuously seal the downstream portion of said cavity while being extruded and whereby expulsion of said material places said cavity in fluid communication with pressure bearing conditioning fluid through said passage means for further conditioning said bearings.

2. In the rock bit of claim 1 wherein said plastic material substantially encases said bearing means to seal said bearing means against the intrusion of deleterious matter.

3. In the rock bit of claim 2 wherein said bearing means includes a plurality of ball bearing members disposed between the cutter member and axle portion.

4. In the rock bit of claim 2 wherein said bearing means includes a plurality of roller bearing members disposed between the cutter member and axle portion.

5. In the rock bit of claim 3 wherein said bearing means also includes a plurality of roller bearing members disposed between the cutter member and axle portion.

6. In the rock bit of claim 5 wherein said plastic material includes a polymer such as polyethylene and is introduced into the bearing cavity of said rock bit to substantially fill said cavity and to substantially encapsulate said bearing means to seal said cavity and to lubricate said bearing means.

7. In the rock bit of claim 6 wherein said polymer has a high molecular weight.

8. In the rock bit of claim 6 wherein said polymer has a low molecular weight.

9. In the rock bit of claim 6 wherein said polymer includes both high and low molecular weights.

10. In the rock bit of claim 1 wherein fluid passage means are subjected to pressurized cooling air so that said plastic material becomes gradually extruded from said cavity downstream of said bearing means whereby said bearing means are cooled by air passing through said cavity after expulsion of said material from said cavity.

* * * * *